O. FACKLAM.
BAND CUTTER AND FEEDER.
APPLICATION FILED JULY 17, 1913.

1,090,522.

Patented Mar. 17, 1914.

Witnesses:
Joh. Enzzin
Karl Friedey

Inventor:
Otto Facklam

UNITED STATES PATENT OFFICE.

OTTO FACKLAM, OF GANTENBECK, NEAR KLÜTZ, GERMANY.

BAND-CUTTER AND FEEDER.

1,090,522. Specification of Letters Patent. Patented Mar. 17, 1914.

Application filed July 17, 1913. Serial No. 779,610.

*To all whom it may concern:*

Be it known that I, OTTO FACKLAM, a subject of the Emperor of Germany, residing at Gantenbeck, near Klütz, Mecklenburg, Germany, have invented a certain Band-Cutter and Feeder, of which the following is a specification.

The present invention relates to a device for opening grain sheaves and delivering them to the threshing machine, and consists in the provision of a chute over which a revolving drum is arranged, means being provided for arresting the sheaves on the chute while reciprocating cutters, connected to the drum, cut them open, the drum having a rake which, after a sheaf has been opened, delivers the grain to the threshing machine.

Figure 1:
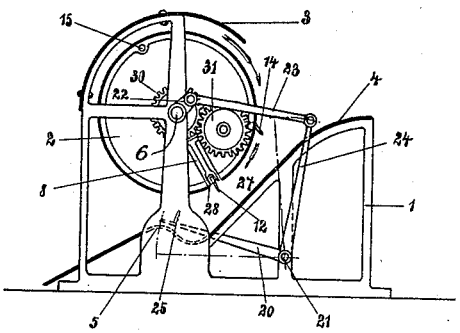
Figure 2:
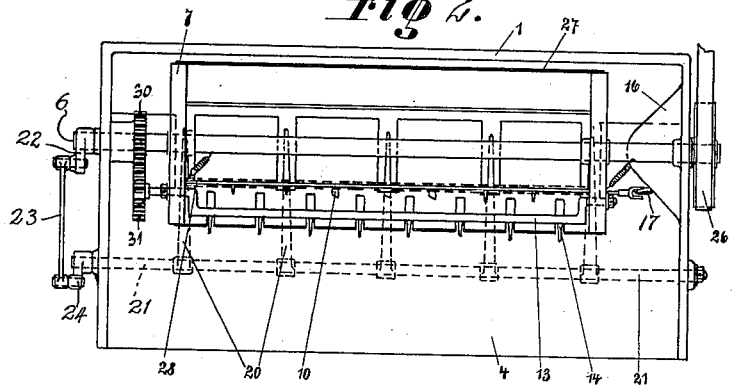
Figure 3:
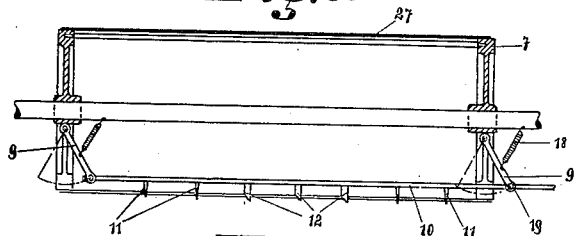
Figure 4:
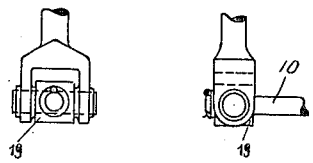

In the accompanying drawings the invention is illustrated by way of example, Figure 1 representing a side view of the machine, Fig. 2, a plan of the same, some parts being removed, Fig. 3, a sectional view of the drum, and Fig. 4, views at right angles of the link mechanism which controls the cutters.

A machine frame 1 carries a chute 4 a small portion 5 of which is bent substantially into S-shape and formed with slots in which the free ends of arms 20, connected to a rock-shaft 21 under the chute, can be moved up and down through the latter. Held in uprights on the machine frame, above the portion 5 of the chute, is a rotatable shaft 6 which is fitted at one end with a crank 22. This crank is connected by means of a rod 23 to an arm 24 which is mounted on the shaft 21 for rocking the latter. Upwardly directed tines 25 are connected to the arms 20 near the free ends so as to work in the slots in the chute when the shaft 21 is rocked.

On the shaft 6, between the uprights, a drum 2 is mounted which is composed of two circular end walls 7 and a circumferential wall 27. A radial slot 8 in each of the walls 7 accommodates a link 9 which is pivoted at its inner end to the wall so that it can swing freely through the slot to either side of said wall. The free ends of the links are bifurcated and hold swiveled bushings 19 (Fig. 4) to which a rod 10 is connected so as to be held parallel with the shaft 6 while it swings with the links. A plurality of spaced cutting blades 12 is connected to the rod 10 between two pairs of tines 11. The cutters 12 and the tines 11 are held at right angles to the rod which moves these elements circularly through a longitudinal slot 28 in the wall 27 when it is swung on the links 9. At one end of the rod 10 a roller 17 is arranged which, in one position of the drum, engages the edge of a stationary cam 16. This cam coöperates with springs 18, acting on the links 9, for swinging the rod and operating the cutters.

Arranged within the drum 2 so as to work behind the cutters is an eccentric shaft 13 which is rotatably held in the walls 7. One end of the shaft 13 projects through the wall 7 and is fitted with a toothed wheel 31. This wheel meshes with a wheel 30 which is equal in size to the wheel 31 and which is rigidly secured to the machine frame so as to be concentric with the shaft 6. As the drum 2 rotates, therefore, the wheel 31 and the shaft 13 will be turned about the axis of the wheel as well as about the shaft 6 at an equal ratio. The shaft 13 is fitted with tines 14 which, during one phase of the revolution, operate in the circumferential slots 29 in the wall 27 and form a kind of rake for transferring the grain to the threshing machine.

The upper part of the drum 2 is covered by a concentric plate 3 or hood connected to the machine frame. A rod 15, which is arranged diametrically opposite the rod 10, connects the walls 7 for strengthening purposes.

The apparatus is mounted on a threshing machine, which may be of any known construction, and is driven from the latter, the shaft 6 being for that purpose fitted with a pulley 26.

The *modus operandi* is as follows:—The sheaves are placed on the chute 4 and rolled along the latter to the curved portion 5 where they are retained. As the rod 10 approaches this portion of the chute, the tines 25 are raised so as to grip the sheaf and hold it in position for being opened. Then the rod 10 is actuated by the cam 16 so as to move the cutters 12 through the slot 28 and pass them between the straws of the sheaf for cutting the band by means of which the latter is tied together. Owing to the movement of the drum 2, the cutters 12 as well as the tines 11 at the same time tend to disperse the sheaf. As soon as the sheaf band has been cut, the tines 25 are withdrawn, and the tines 14, which have meanwhile been projected through the wall 27, rake the grain off the chute into the threshing machine. This is repeated for each revolution of the drum. The length and spacing of the cutters 12, as well as the length and movement of the links 9 should be so adjusted that a cutting of the sheaf band is bound to take place even when the sheaves are irregular in size. The movement of the arms 20 is so adjusted that the tines 25 reach the highest position only just after the cutting movement of the cutters 12 has commenced.

I claim:—

1. A sheaf opener, comprising a frame, a chute arranged in said frame for the reception of the sheaves and having slots therein, a revolving drum mounted in the frame above the chute and provided with apertures, a rod suspended in said drum parallel to the drum shaft, a cam connected to the frame so as to contact with and reciprocate the rod when the latter passes the chute, means for raising the sheaves from the chute and holding them against the drum when the rod passes, cutters connected to said rod and movable in said apertures in the drum so as to cut the bands of the sheaves when the rod is reciprocated, and means connected to the drum for discharging the opened sheaf from the chute.

2. A sheaf opener, comprising a frame, a chute arranged in said frame for the reception of the sheaves and having slots therein, a revolving drum mounted in the frame above said chute, a rock-shaft arranged under the chute, means for rocking the shaft through the medium of the drum shaft, arms connected to the rock-shaft having their free ends movable up and down through said chute slots, tines connected to said arms and movable in said slots so as to hold the sheaves against the drum, cutters movably arranged at the circumference of the drum, means for moving the cutters longitudinally of the drum while the sheaf is held by the said tines for cutting the band of said sheaf, and means for discharging the opened sheaf from the chute.

3. A sheaf opener, comprising a frame, a chute arranged in said frame for the reception of the sheaves and having slots therein, a revolving drum mounted in the frame above said chute and having slots therein, a rock-shaft arranged under the chute, means for rocking said shaft through the medium of the drum shaft, arms connected to said rock shaft so that their free ends move up and down through said chute slots, tines connected to the arms and adapted to hold the sheaves against the drum, cutters movably arranged at the circumference of said drum, means for moving said cutters longitudinally of the drum so as to cut the band of said sheaves, an eccentric shaft arranged in the drum parallel to the shaft of the latter and adapted to work behind the cutters, a gear wheel connected to one end of said latter shaft outside the drum, a stationary gear wheel, concentric with the drum shaft, secured to the frame so as to mesh with the wheel of the eccentric shaft and turn the latter, and tines connected to said eccentric shaft operating through said drum slots after the cutters have been in operation and discharged the open sheaves from the chute.

4. A sheaf opener, comprising a frame, a chute arranged in said frame for the reception of the sheaves, a revolving drum mounted in the frame above the chute and having a longitudinal slot therein, a rod suspended by links in said drum parallel to the drum shaft, means for raising the sheaves against the drum when the rods passes, means for reciprocating the rods, cutters and tines connected to the rod operating through said drum slot when the rod is reciprocated, the cutters being arranged so as to cut the band of the sheaves, and a revolving rake connected to the drum so as to work behind the cutters and discharge the opened sheaves from the chute.

OTTO FACKLAM.

Witnesses:
ERNEST H. L. MUMMENHOFF,
CARL SINGER.

Copies of this patent may be obtained for five cents each, by addressing the "Commissioner of Patents, Washington, D. C."